United States Patent
Borg (10) Patent No.: US 7,308,868 B1
(45) Date of Patent: Dec. 18, 2007

(54) PROTECTIVE CAGE (76) Inventor: Jerry J. Borg, 150W. 51St St. Apt. #1914, New York, NY (US) 10019

( * ) Notice: Subject to any disclaimer, the term of this patent is extended or adjusted under 35 U.S.C. 154(b) by 304 days.

(21) Appl. No.: 11/186,203

(22) Filed: Jul. 22, 2005

(51) Int. Cl.
A01K 1/00 (2006.01)
E04H 9/16 (2006.01)

(52) U.S. Cl. ........................................ 119/452; 52/101
(58) Field of Classification Search ................ 119/452, 119/751, 502; 52/101
See application file for complete search history.

(56) References Cited

U.S. PATENT DOCUMENTS

| | | | | |
|---|---|---|---|---|
| 224,520 A | * | 2/1880 | Dougherty | 49/58 |
| 727,054 A | * | 5/1903 | Arndt | 47/32.5 |
| 1,286,416 A | * | 12/1918 | Rix | 47/32.5 |
| 2,306,080 A | * | 12/1942 | Peles | 52/101 |
| 2,777,488 A | * | 1/1957 | Gilbert et al. | 269/54.5 |
| 3,282,000 A | * | 11/1966 | Shaw et al. | 52/101 |
| 3,407,550 A | * | 10/1968 | Shaw | 52/101 |
| 3,425,231 A | | 2/1969 | Rehrer | |
| 4,110,943 A | * | 9/1978 | Carlson | 52/101 |
| 4,309,072 A | * | 1/1982 | Tweeddale | 385/102 |
| 4,596,731 A | * | 6/1986 | Cudmore et al. | 428/134 |
| 4,815,235 A | * | 3/1989 | Faltinowski | 52/101 |
| 4,815,896 A | * | 3/1989 | Fox et al. | 405/158 |
| 4,907,380 A | * | 3/1990 | Jannin | 52/4 |
| 4,924,622 A | * | 5/1990 | Goreham | 43/100 |
| 5,410,837 A | * | 5/1995 | Kazzyk | 43/66 |
| 5,433,029 A | * | 7/1995 | Donoho et al. | 43/1 |
| 5,451,239 A | * | 9/1995 | Sewell et al. | 47/1.01 R |
| 5,528,858 A | | 6/1996 | Omdahl | |
| 5,615,524 A | * | 4/1997 | Costa, Sr. | 52/101 |
| 5,648,641 A | * | 7/1997 | Guthrie | 174/139 |
| 5,691,032 A | * | 11/1997 | Trueblood et al. | 428/136 |
| 5,892,446 A | | 4/1999 | Reich | |
| 6,095,091 A | * | 8/2000 | Byrne | 119/712 |
| 6,226,933 B1 | * | 5/2001 | Nelson et al. | 52/101 |
| 6,250,023 B1 | * | 6/2001 | Donoho | 52/101 |
| 6,519,901 B1 | * | 2/2003 | Nelson et al. | 52/101 |
| 6,575,973 B1 | * | 6/2003 | Shekalim | 606/62 |
| 6,770,809 B1 | * | 8/2004 | De France | 174/5 R |
| 6,775,950 B2 | * | 8/2004 | Donoho | 52/101 |
| 7,040,058 B2 | * | 5/2006 | Finkelstein | 52/101 |
| D546,410 S | * | 7/2007 | Wiesener et al. | D22/120 |
| 7,243,465 B2 | * | 7/2007 | Donoho | 52/101 |

* cited by examiner

Primary Examiner—Yvonne R. Abbott (57) ABSTRACT

A cage includes side panels, each having top and bottom edges extending along a length of the cage. Coextensive top and bottom panels have sides extending along a length of the cage and are engaged with the side panels, defining a cavity therebetween. End panels are conjoined to the top, bottom and side panels. One end panel includes an access door pivotal about a fulcrum axis. Each side, top, bottom and end panel is formed from rigid steel shafts arranged in a mesh pattern. A mechanism is included for locking the access door at a lowered position. Spikes extend from the cage for deterring animals from tampering therewith. The spikes fit between the mesh pattern and lay coplanar with the side, top, bottom, and end panels during lowered positions. The spikes are evenly spaced along the panels. A mechanism is included for rotating the spikes between extended and retracted positions.

15 Claims, 10 Drawing Sheets

PROTECTIVE CAGE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to protective cages and, more particularly, to a protective cage for shielding a user from wildlife threat.

2. Prior Art

Avid outdoorsmen and women around the globe enjoy the freedom and peace they find during their outings in nature. Unfortunately, many individuals are deterred from sharing this joyous experience due to the fear of being attacked by wild animals. For example, in North America the greatest fear comes from bears, in Russia and Asia the people fear wolves and tigers, and in Africa there are lions and leopards, to name only a few.

Although the chances of being attacked by a bear or other such animal while camping are slim, it has happened. Many times those attacks could have been prevented by those persons themselves through simply disposing of left over food in the appropriate manner and through adequate lighting of their campground. As the result of this fear, the individuals that do venture out into the wild find that they are not able to sleep peacefully at night, and thus wake up not fully rested. This can greatly diminish the amount of fun and joy that the person experiences during the day.

Many attempts have been made in the prior art to provide devices and apparatuses that can deter such wild animals. One such an example utilizes a spray of water to scare off animals, but such devices necessitate bringing water lines to the area that needs protection, which is rather difficult, if not impossible, in the wild. Further, water lines are subject to freeze damage in winter, which is a time when many animal attacks occur. A further limitation of such devices is that they will also wet people who might periodically enter the designated area for recreation.

Other devices have heat and motion sensors that activate audiotapes of dogs barking and other noises that are intended to ward off wild animals. Unfortunately, wild animals such as bears and wolves typically habituate to such sounds, eventually overcoming their own fears and thus approach the camp site regardless. Some of these prior devices require a conventional plug-in power source, so are further hampered in their convenience to the user by the need to bring electricity to the device. Both of the above mentioned devices are also limited in the fact that they only protect a certain area, but provide no protection to the actual person that is camping, hiking, etc.

Accordingly, a need remains for a protective cage in order to overcome the above-noted shortcomings. The present invention satisfies such a need by providing a protective cage that is easy to transport and construct, sturdy in design, and provides improved safety to campers and hikers. Such a protective cage completely encloses the camper's sleeping bag or cot, thus when the user is ready to sleep they simply climb into the cage and lie down. The protective cage fully encloses the user, isolating them from the teeth and claws of wild animals. If an animal does choose to attack, they are further deterred by the spikes positioned on the outside of the cage and pointing towards them. As a result, the camper can relax and rest peacefully, and thus more fully enjoy their outdoors experience.

BRIEF SUMMARY OF THE INVENTION

In view of the foregoing background, it is therefore an object of the present invention to provide a protective cage. These and other objects, features, and advantages of the invention are provided by a cage for shielding a user from wildlife threat.

The cage includes a pair of oppositely facing side panels wherein each have a centrally registered longitudinal axis and further have top and bottom edges equidistantly spaced from the respective axes. Such top and bottom edges extend along an entire longitudinal length of the cage and are aligned parallel the respective axes.

Coextensively shaped top and bottom panels are provided with oppositely disposed sides extending along an entire longitudinal length of the cage. Such top and bottom panels are directly engaged with the side panels for effectively defining a cavity therebetween.

A pair of oppositely facing end panels are directly conjoined to the top and bottom panels and the side panels respectively. One of the end panels includes an access door pivotal about a fulcrum axis defined orthogonal to the longitudinal axes of the side panels. Each of the side panels, top and bottom panels and the end panels are advantageously formed from rigid steel shafts arranged in a mesh pattern.

A mechanism is included for locking the access door at a lowered position. Such a locking mechanism preferably includes first and second pairs of finger tabs pivotally conjoined directly to opposite sides of the access door. The finger tabs are rotatable along a 360 degree arcuate path and equidistantly offset from the access door sides. Each of the first and second pairs of finger tabs extend beyond the sides of the access door and terminate laterally inwardly of opposed sides of the one end panel such that the access door advantageously cannot be pivoted beyond a lowered position while the first and second pairs of finger tabs are aligned parallel to the fulcrum axis.

A plurality of spikes extend outwardly from the cage for advantageously and effectively deterring animals from tampering with the cage. The spikes are suitably sized and shaped for fitting between the mesh pattern in such a manner that the spikes lay coplanar with the side panels, the top and bottom panels, and the end panels respectively during lowered positions. Such spikes are evenly spaced along the side panels, the top and bottom panels and the end panels respectively.

A mechanism is included for manually rotating the spikes between extended and retracted positions wherein the extended position is defined orthogonal to an associated one of the side panels, top and bottom panels and end panels and the retracted position is defined parallel to the associated panel. Such a manual rotating mechanism preferably includes a plurality of rectilinear housings situated to an exterior of the cage and spaced adjacent to selected ones of the side panels, the top and bottom panels and end panels respectively.

Each of the housings has a hollow tubular shape provided with a threaded interior surface extending along an entire longitudinal length thereof respectively. A plurality of teethed gears are threadably engaged with the interior surface of the tubes respectively. At least one actuating rod is rotatably seated within a selected one of the steel shafts. Such an actuating rod laterally extends out of the selected steel shaft and terminates within the selected housing. The rod is monolithically formed with the teethed gears such that the rod effectively rotates within the selected steel shaft and about an axis defined orthogonal to the selected housing as the teethed gears rotate within the selected housing.

An L-shaped lever is monolithically formed with the rod and extends outwardly from the selected steel shaft. Such a lever is spaced from the selected housing and is manually rotatable along an arcuate path defined along at least 90 degrees. The teethed gears are monolithically formed with the spikes and rotate in sync with the rod such that the spikes are effectively biased between raised and lowered positions when the lever is articulated 90 degrees.

The assembly may further include a plurality of fastening members including male and female members monolithically formed with the cage and situated adjacent to opposed corners of the side panels, the top and bottom panels and the end panels respectively. Such male members are slidably positional into the female members by lifting selected ones of the side panels, the top and bottom panels and the end panels along a vertical plane such that the user can advantageously quickly and efficiently assemble the cage as needed.

The assembly preferably further includes a plurality of annular rings positioned about a portion of the one end panel and a top edge of the access door such that the access door can conveniently and effectively be pivoted about the fulcrum axis when the locking mechanism is disengaged.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-10 by the reference numeral 10 and is intended to provide a protective cage. It should be understood that the assembly 10 may be used to protect users from many different types of threats and should not be limited in use to only protect campers from wildlife threats.

Referring initially to FIGS. 1, 2, 4, 5 and 10, the assembly 10 includes a pair of oppositely facing side panels 20 wherein each have a centrally registered longitudinal axis and further have top 21 and bottom 22 edges equidistantly spaced from the respective axes. Such top 21 and bottom 22 edges extend along an entire longitudinal length of the cage 10 and are aligned parallel the respective axes. Of course, the side panels 20 may be produced in a variety of different shapes and sizes, as is obvious to a person of ordinary skill in the art.

Figure 1:
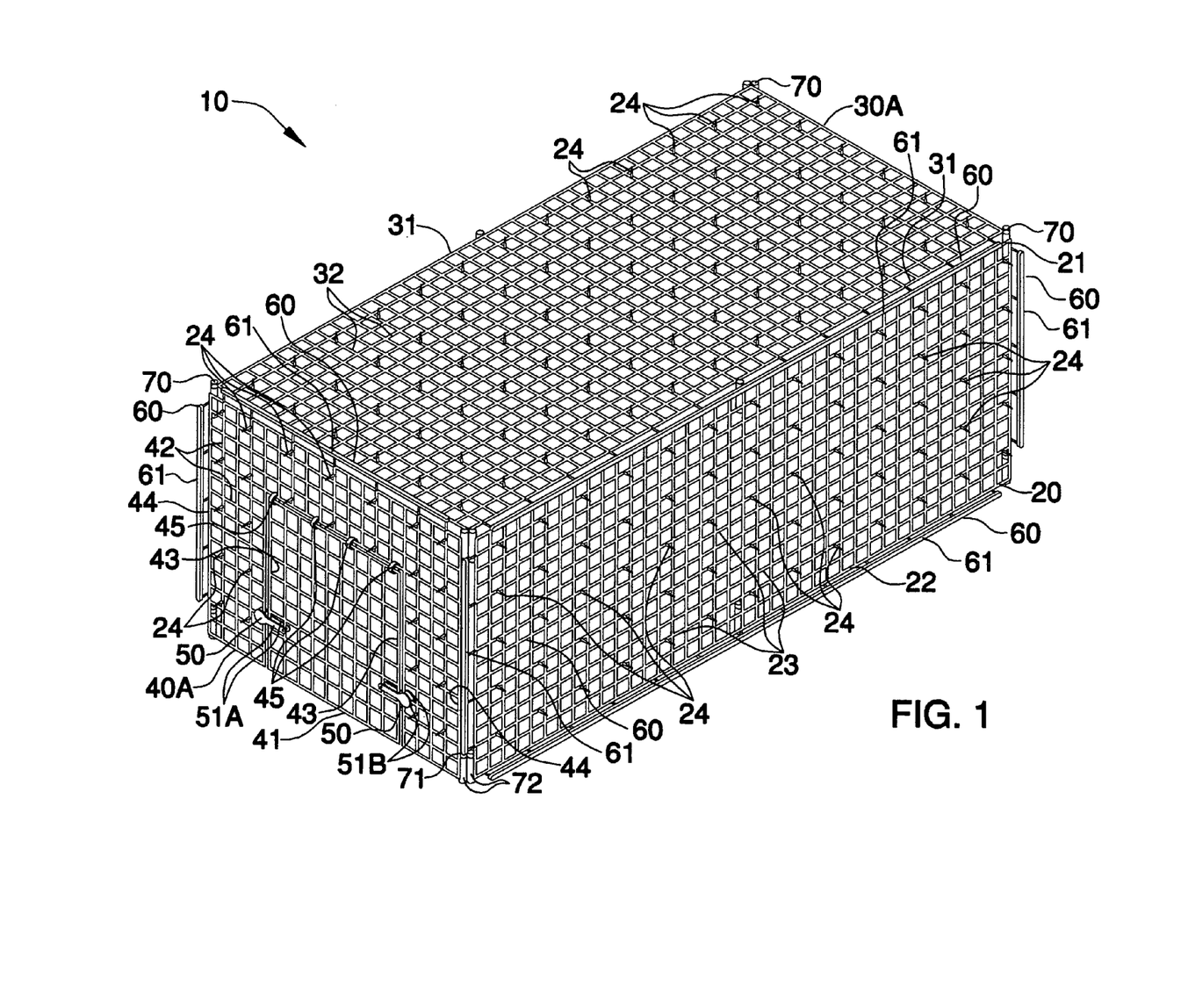
FIG. 1 is a perspective view showing a protective cage for shielding a user from wildlife threats, in accordance with the present invention.
Figure 2:
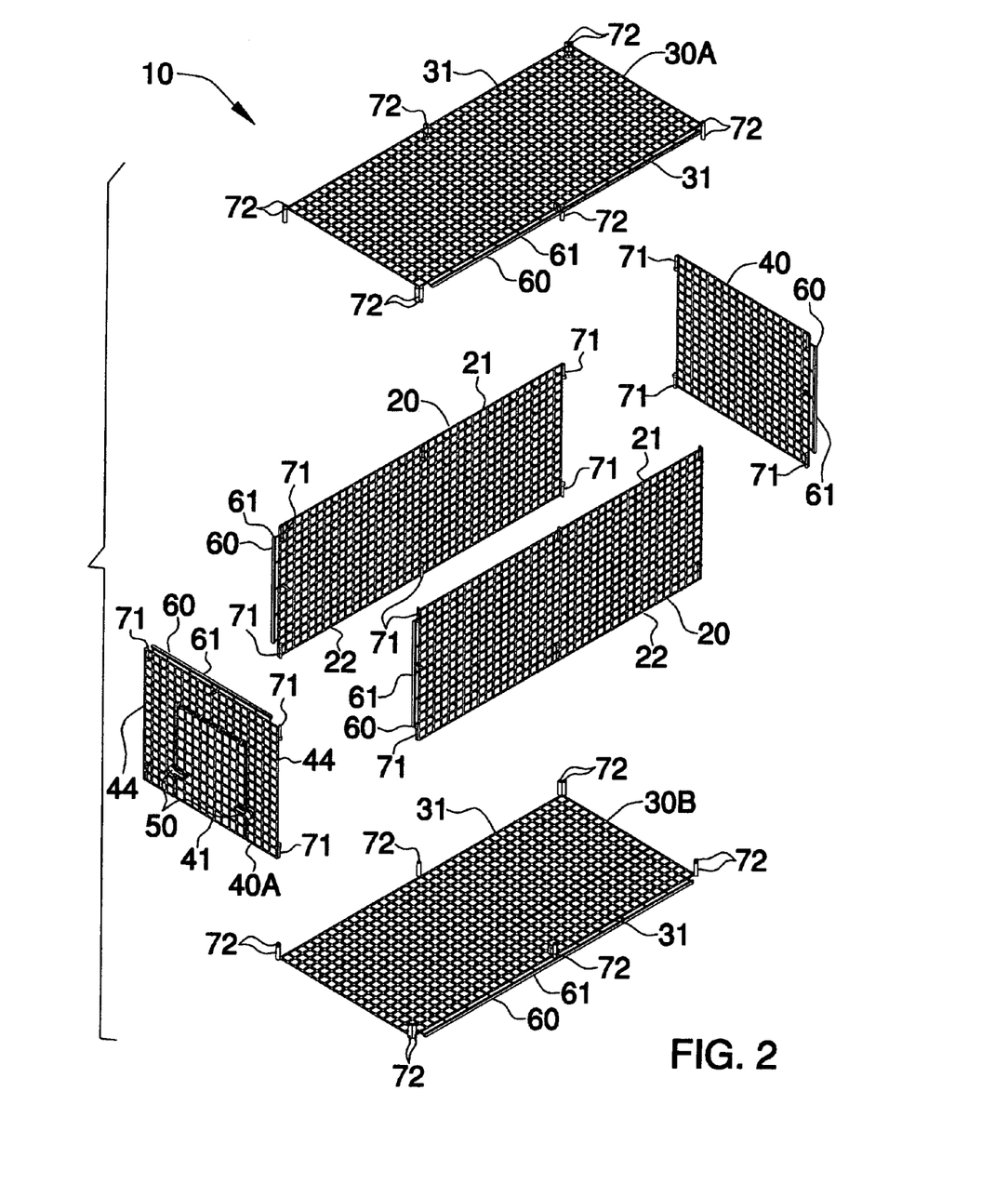
FIG. 2 is an exploded perspective view of the assembly shown in FIG. 1.
Figure 10:
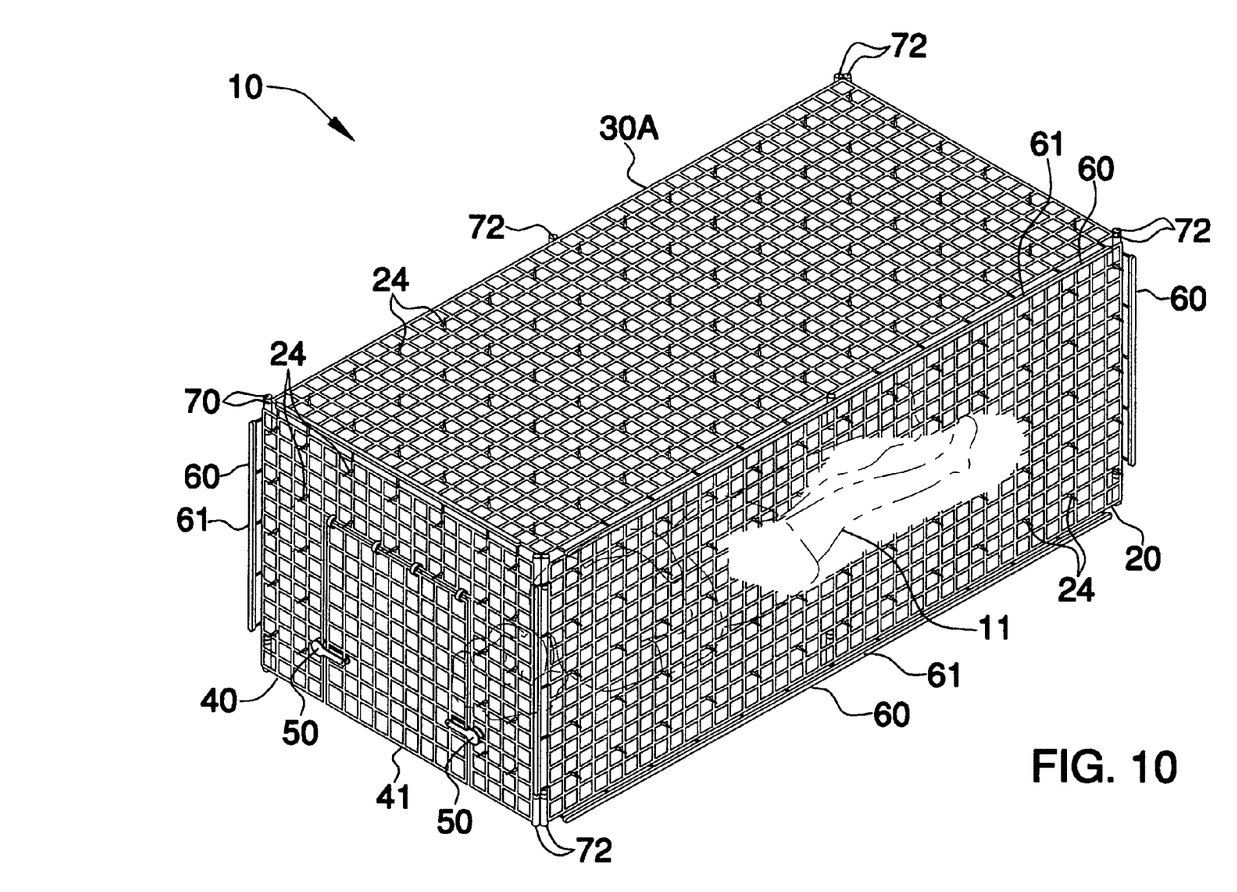
FIG. 10 is a partially exposed perspective view of the assembly shown in FIG. 1, showing a user positioned therein during operating conditions.

Referring to FIGS. 1, 2 and 10, coextensively shaped top 30A and bottom 30B panels are provided with oppositely disposed sides 31 extending along an entire longitudinal length of the cage 10. Such top 30A and bottom 30B panels are directly engaged, with no intervening elements, with the side panels 20, which is essential for effectively defining a cavity therebetween that is suitably sized and shaped for allowing an individual 11 to become fully enclosed therein, as is best shown in FIG. 10. Of course, the top 30A and bottom 30B panels may be produced in a variety of different shapes and sizes, as is obvious to a person of ordinary skill in the art.

Referring to FIGS. 1, 2, 4, 5, 6 and 10, a pair of oppositely facing end panels 40 are directly conjoined, with no intervening elements, to the top 30A and bottom 30B panels and the side panels 20 respectively. One of the end panels 40A includes an access door 41 pivotal about a fulcrum axis defined orthogonal to the longitudinal axes of the side panels 20. Such an access door 41 is important and convenient for allowing a user to quickly and easily enter the cavity of the cage 10. Each of the side panels 20, top 30A and bottom 30B panels and the end panels 40 are advantageously formed from rigid steel shafts 23, 32 and 42, respectively, arranged in a mesh pattern that effectively prevents wild animals from reaching the individual with their teeth and/or claws. Of course, the side 20, top 30A, bottom 30B, and end 40 panels, may be produced from any suitable material and the shafts 23, 32 and 42 may be arranged in alternate patterns, as is obvious to a person of ordinary skill in the art.

Figure 6:
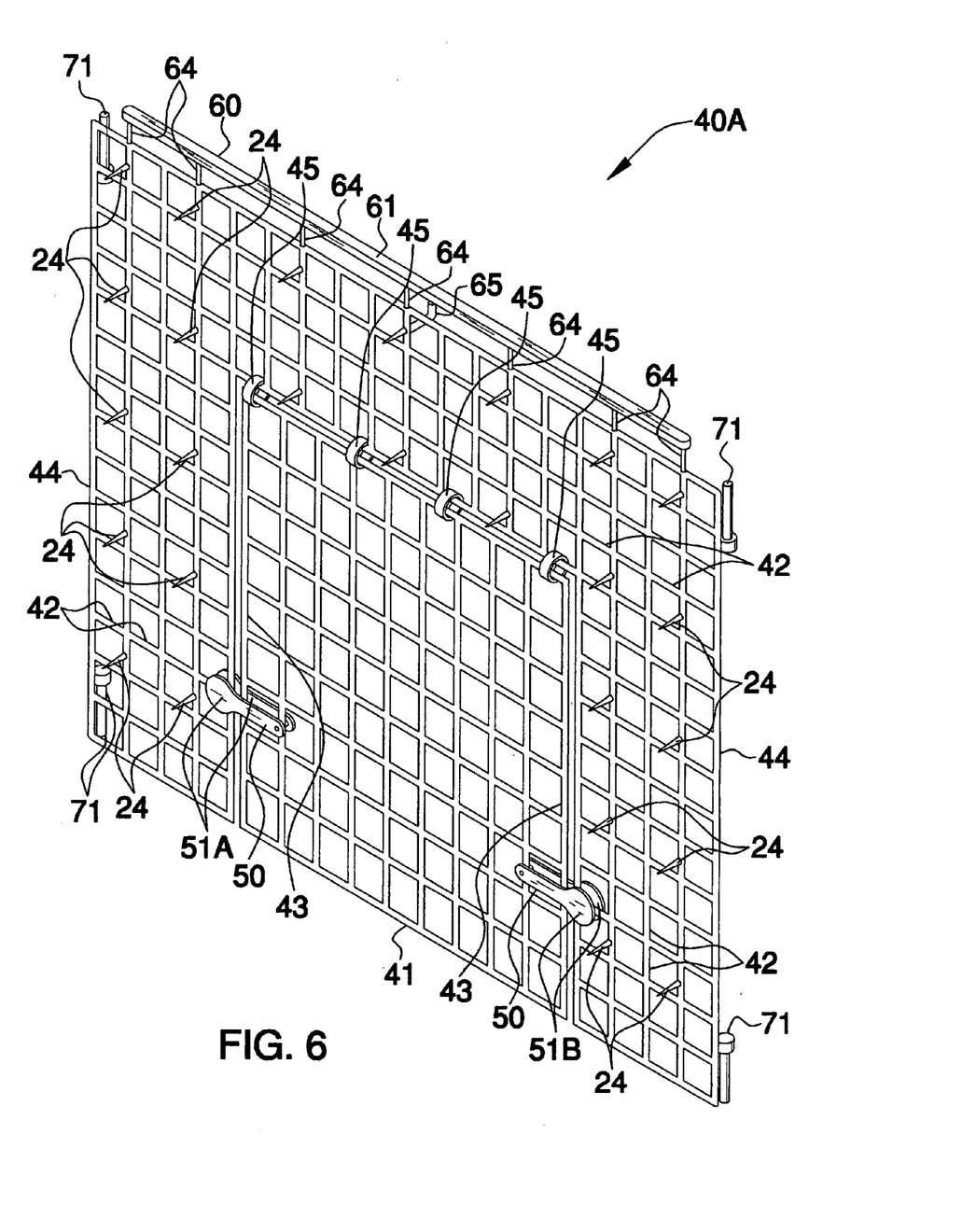
FIG. 6 is an enlarged perspective view of the one end panel shown in FIG. 2, showing the access door and the locking mechanism associated therewith.

Referring to FIGS. 1, 6 and 10, a mechanism 50 is included for locking the access door 41 at a lowered position. Such a locking mechanism 50 includes first 51A and second 51B pairs of finger tabs 51 pivotally conjoined directly, with no intervening elements, to opposite sides 43 of the access door 41. The finger tabs 51 are rotatable along a 360 degree arcuate path and equidistantly offset from the access door sides 43. Each of the first 51A and second 51B pairs of finger tabs 51 extend beyond the sides 43 of the access door 43 and terminate laterally inwardly of opposed sides 44 of the one end panel 40A, which is crucial such that the access door 41 advantageously cannot be pivoted beyond a lowered position while the first 51A and second 51B pairs of finger tabs 51 are aligned parallel to the fulcrum axis. Thus, once a user has lowered the access door 41 and locked same in place with the finger tabs 51, an outside intruder, such as a bear, advantageously can not gain access to the cage 10 from the exterior thereof. The individual 11 located within the cavity of the cage 10 can relax and rest peacefully throughout the night.

Referring to FIGS. 1 through 10, a plurality of spikes 24 extend outwardly from the cage 10 and are vital for advantageously and effectively deterring animals from tampering with the cage 10. The spikes 24 are suitably sized and shaped for fitting between the mesh pattern in such a manner that the spikes 24 lay coplanar with the side panels 20, the top 30A and bottom 30B panels, and the end panels 40 respectively during lowered positions. Such spikes 24 are evenly spaced along the side panels 20, the top 30A and bottom 30B panels and the end panels 40 respectively. Of course, the spikes 24 may be arranged in any suitable pattern, as is obvious to a person of ordinary skill in the art.

Still referring to FIGS. 1 through 10, a mechanism 60 is included for manually rotating the spikes 24 between extended and retracted positions wherein the extended position is defined orthogonal to an associated one of the side panels 20, top 30A and bottom 30B panels and end panels 40 and the retracted position is defined parallel to the associated panel. This rotating feature of the spikes 24 is critical and advantageous for allowing the assembly 10 to be manipulated by a user without the danger of inadvertently being impaled by one of the spikes 24. Such a manual rotating mechanism 60 includes a plurality of rectilinear housings 61 situated to an exterior of the cage 10 and spaced adjacent to selected ones of the side panels 20, the top 30A and bottom 30B panels and end panels 30 respectively.

Figure 3A:
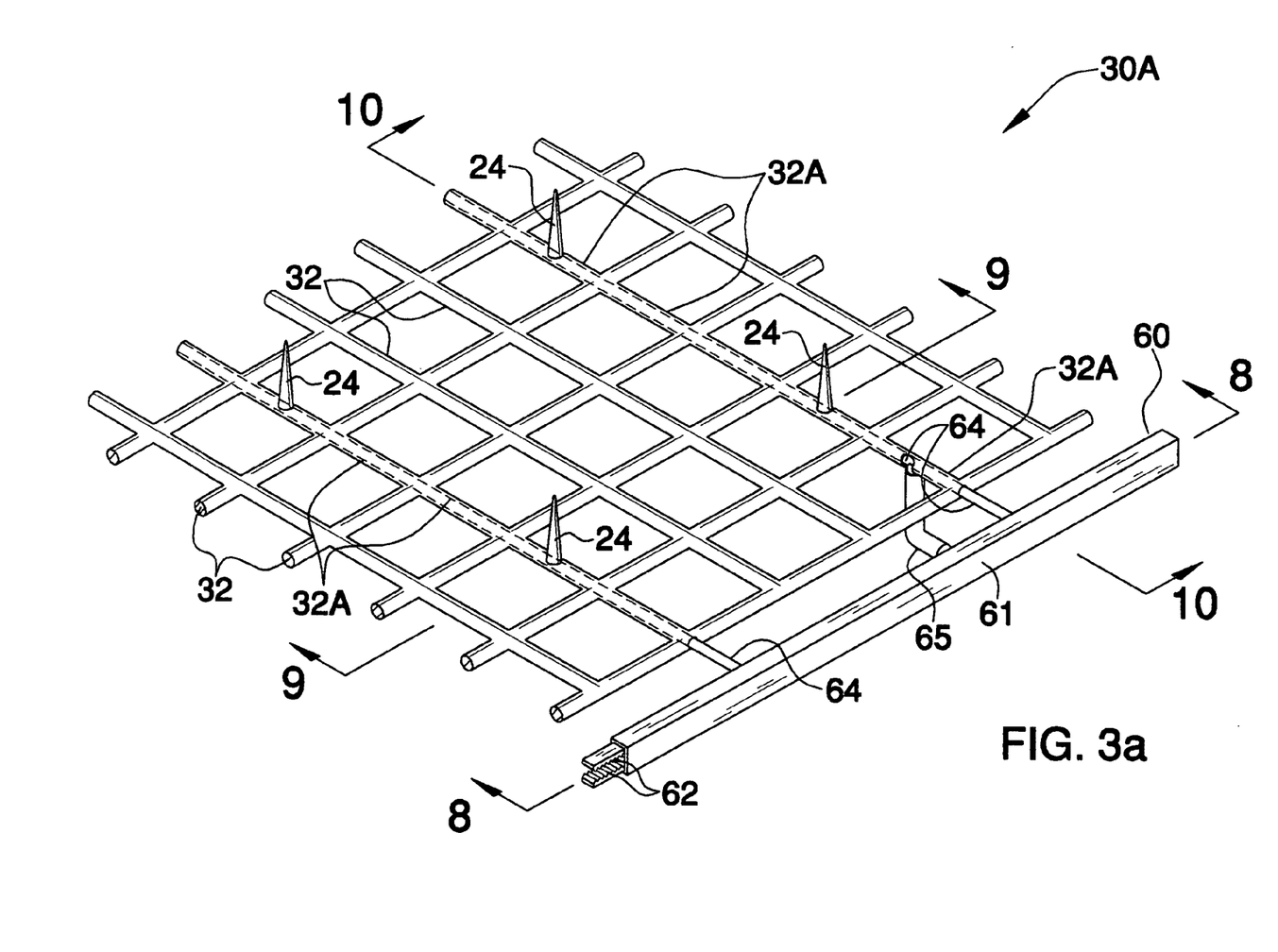
FIG. 3a is an enlarged perspective view of the top panel shown in FIG. 2, showing the spikes rotated to an extended position orthogonal to the panel.
Figure 3B:
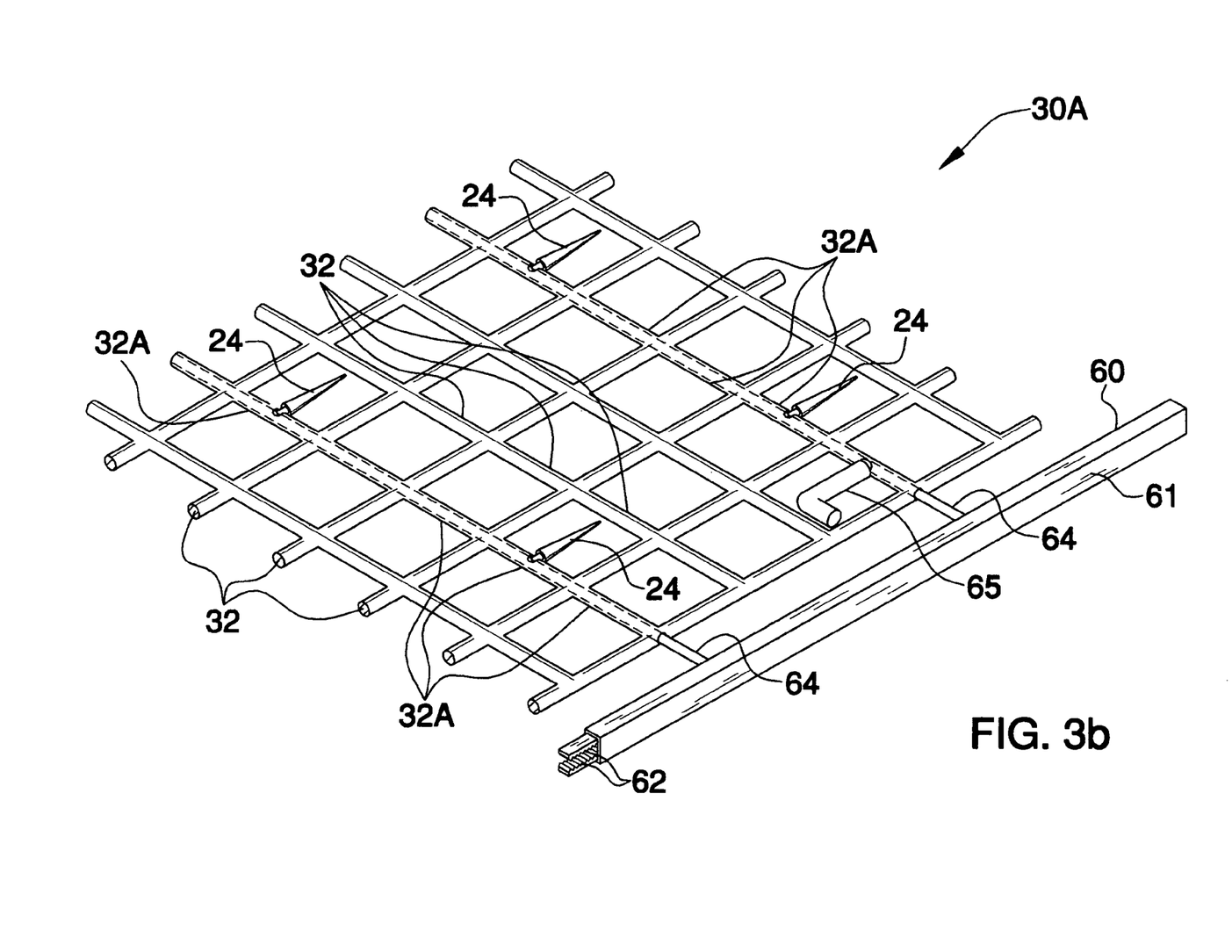
FIG. 3b is an enlarged perspective view of the top panel shown in FIG. 2, showing the spikes rotated to a retracted position parallel to the panel.
Figure 4:
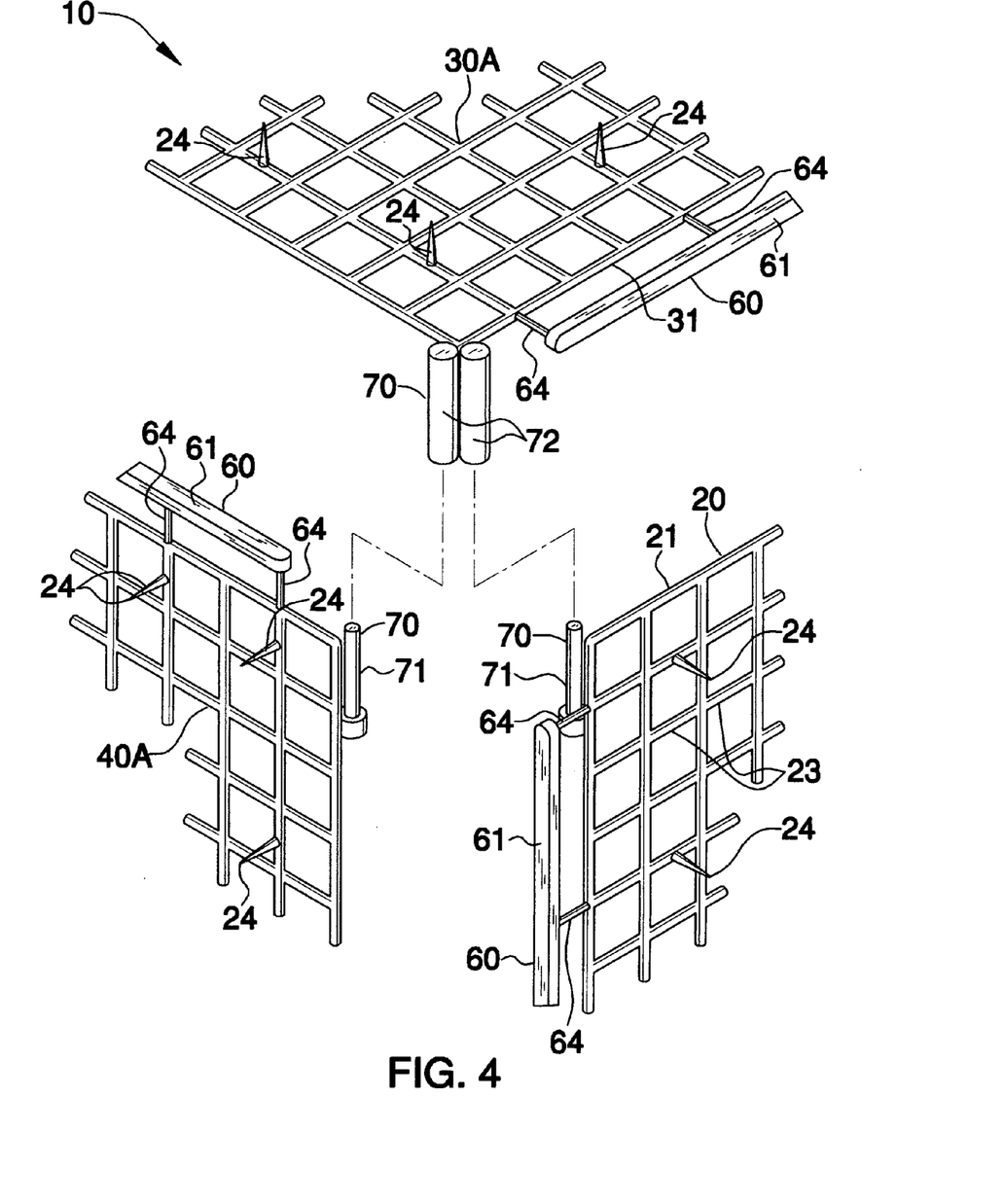
FIG. 4 is an enlarged exploded view of the top panel, one side panel and one end panel shown in FIG. 2, showing the fastening members.
Figure 5:
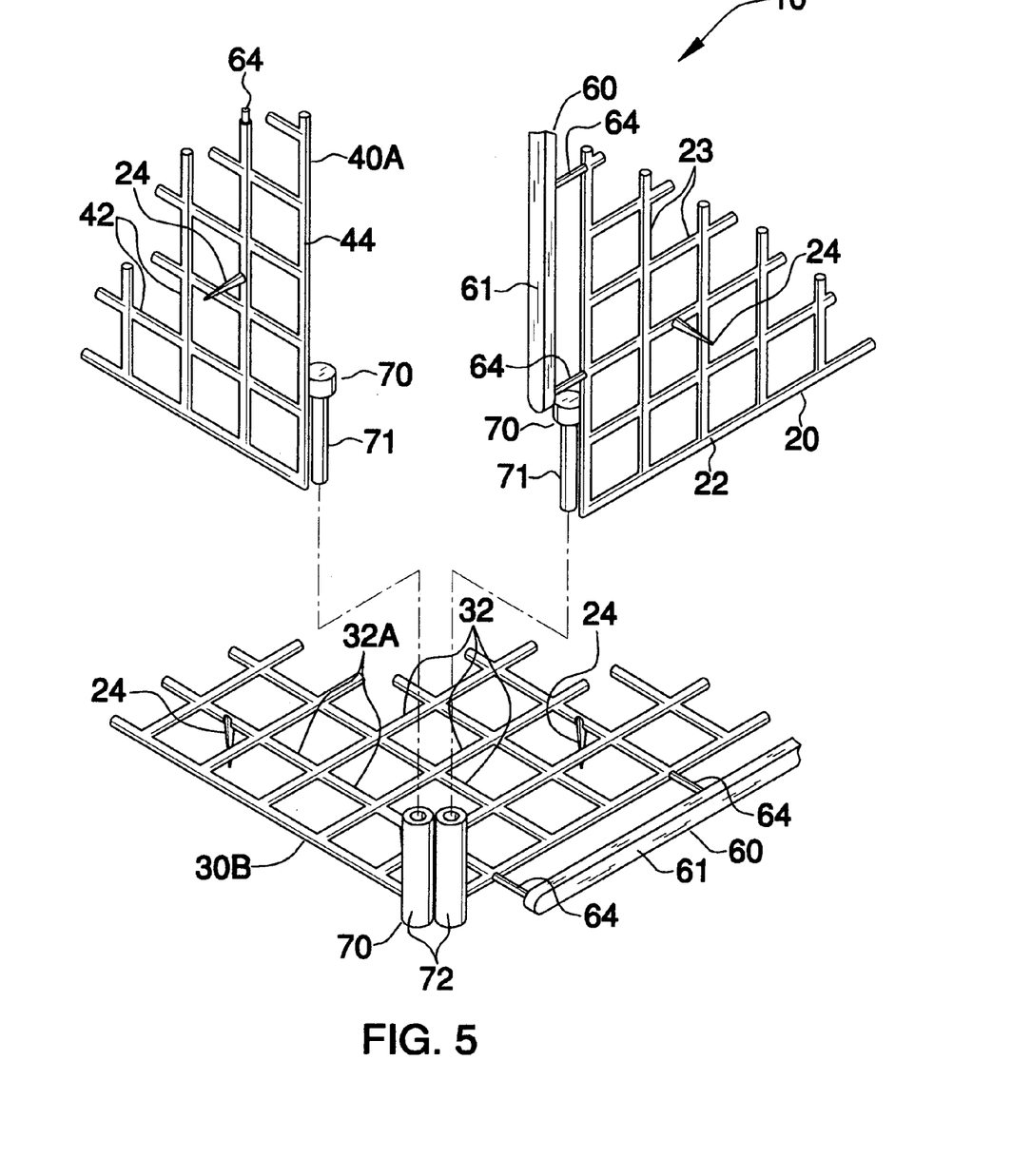
FIG. 5 is an enlarged exploded view of the bottom panel, one side panel and one end panel shown in FIG. 2, showing the fastening members.
Figures 7, 8:
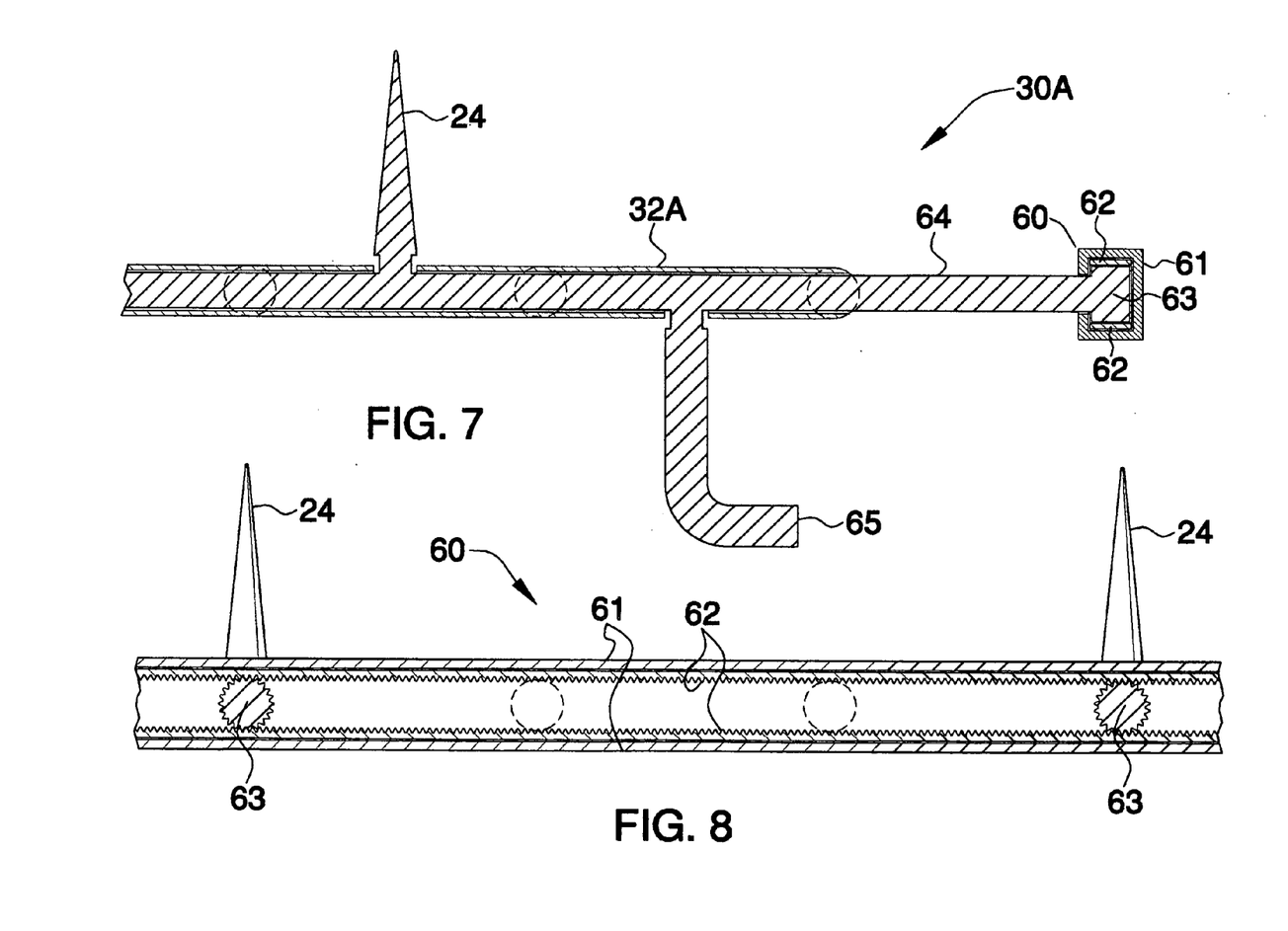
FIG. 7 is a cross-sectional view of the top panel shown in FIG. 3a, taken along line 7-7 and showing the L-shaped lever monolithically formed with the rod.
FIG. 8 is a cross-sectional view of rotating mechanism housing shown in FIG. 3a, taken along line 8-8 and showing the threaded inner surface and toothed gears of the rotating mechanism.
Figure 9:
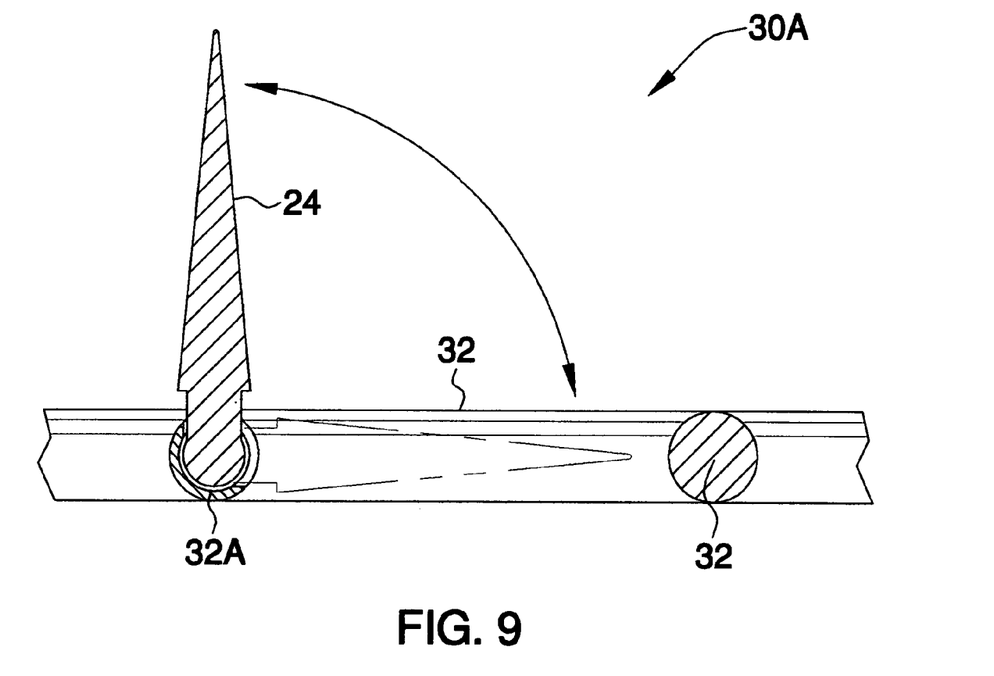
FIG. 9 is a cross-sectional view of the top panel shown in FIG. 3a, taken along line 9-9.

Referring to FIGS. 3a, 3b, 7, 8 and 9, each of the housings 61 has a hollow tubular shape provided with a threaded interior surface 62 extending along an entire longitudinal length thereof respectively, as is best shown in FIG. 8. A plurality of teethed gears 63 are threadably engaged with the interior surface 62 of the housings 61 respectively, as is best shown in FIG. 8. At least one actuating rod 64 is rotatably seated within a selected one 32A of the steel shafts 32, as is shown in FIGS. 3a and 7. This arrangement is similar for other steel shafts 23, 42 of the side panels 20 and end panels 40, respectively. Such an actuating rod 64 laterally extends out of the selected steel shaft 32A and terminates within the selected housing 61. The rod 64 is monolithically formed with the teethed gears 63 such that the rod 64 effectively rotates within the selected steel shaft 32A and about an axis defined orthogonal to the selected housing 61 as the teethed gears 63 rotate within the selected housing 61.

Referring to FIGS. 3a, 3b, 6 and 7, an L-shaped lever 65 is monolithically formed with the rod 64 and extends outwardly from the selected steel shaft 32A. Such a lever 65 is spaced from the selected housing 61 and is manually rotatable along an arcuate path defined along at least 90 degrees. The teethed gears 63 are monolithically formed with the spikes 24 and rotate in sync with the rod 64 such that the spikes 24 are effectively biased between raised and lowered positions when the lever 65 is articulated 90 degrees, as is best shown FIGS. 3a, 3b and 9.

Referring to FIGS. 1, 2, 4, 5, 6 and 10, the assembly 10 further includes a plurality of fastening members 70 including male 71 and female 72 members monolithically formed with the cage 10 and situated adjacent to opposed corners of the side panels 20, the top 30A and bottom 30B panels and the end panels 40 respectively. Such male members 71 are slidably positional into the female members 72 by lifting selected ones of the side panels 20, the top 30A and bottom 30B panels and the end panels 40 along a vertical plane, which is vital such that the user can advantageously quickly and efficiently assemble the cage 10 as needed. This feature is also advantageous for allowing the assembly 10 to be transported in a disassembled state wherein the assembly 10 is easier to carry and manipulate than in the assembled state.

Referring to FIGS. 1, 6 and 10, the assembly 10 also includes a plurality of annular rings 45 positioned about a portion of the one end panel 40A and a top edge 46 of the access door 41, which is important and advantageous such that the access door 41 can conveniently and effectively be pivoted about the fulcrum axis when the locking mechanism 50 is disengaged. Such annular rings 45 advantageously reduced the effort needed to pivot the access door 41 between open and closed positions, thus allowing adults, children, the elderly and those with physical ailments to all use the assembly 10.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A cage for shielding a user from wildlife threat, said cage comprising:
    a pair of oppositely facing side panels each having a centrally registered longitudinal axis and further having top and bottom edges equidistantly spaced from the respective axes, said top and bottom edges extending along an entire longitudinal length of said cage and being aligned parallel the respective axes;
    coextensively shaped top and bottom panels provided with oppositely disposed sides extending along an entire longitudinal length of said cage, said top and bottom panels being directly engaged with said side panels for defining a cavity therebetween;
    a pair of oppositely facing end panels directly conjoined to said top and bottom panels and said side panels respectively, one said end panels including an access door pivotal about a fulcrum axis defined orthogonal to the longitudinal axes of said side panels;
    means for locking said access door at a lowered position;
    a plurality of spikes extending outwardly from said cage for deterring animals from tampering with said cage; and
    means for manually rotating said spikes between extended and retracted positions wherein said extended position is defined orthogonal to an associated one of said side panels, top and bottom panels and end panels and said retracted position is defined parallel to said associated panel;
    wherein each said side panels, top and bottom panels and said end panels are formed from rigid steel shafts arranged in a mesh pattern.

2. The assembly of claim 1, wherein said manual rotating means comprises:
    a plurality of rectilinear housings situated exterior of said cage and spaced adjacent to selected ones of said side panels, top and bottom panels and end panels respectively, each said housings having a hollow tubular shape provided with a threaded interior surface extending along an entire longitudinal length thereof respectively;
    a plurality of teethed gears threadably engaged with said interior surface of said tubes respectively;
    at least one actuating rod rotatably seated within a selected one of said steel shafts, said actuating rod laterally extending out of said selected steel shafts and terminating within said selected housing wherein said rod is monolithically formed with said teethed gears such that said rod rotates within said selected steel shaft and about an axis defined orthogonal to said selected housing as said teethed gears rotate within said selected housing;
    an L-shaped lever monolithically formed with said rod and extending outwardly from said selected steel shaft, said lever being spaced from said selected housing and manually rotatable along an arcuate path defined along at least 90 degrees; and
    wherein said teethed gears are monolithically formed with said spikes and rotate in sync with said rod such that said spikes are biased between raised and lowered positions when said lever is articulated 90 degrees.

3. The assembly of claim 1, further comprising: a plurality of fastening members including male and female members monolithically formed with said cage and situated adjacent opposed corners of said side panels, said top and bottom panels and said end panels respectively, said male members being slidably positional into said female members by lifting selected ones of said side panels, said top and bottom panels and said end panels along a vertical plane such that the user can quickly and efficiently assemble said cage as needed.

4. The assembly of claim 1, wherein said locking means comprises:
    first and second pairs of finger tabs pivotally conjoined directly to opposite sides of said access door, said finger tabs being rotatable along a 360 degree arcuate path and equidistantly offset from the access door sides, each said first and second pairs of finger tabs extending beyond the sides of said access door and terminating laterally inwardly of opposed sides of said one end panel such that said access door cannot be pivoted beyond a lowered position while said first and second pairs of finger tabs are aligned parallel to the fulcrum axis.

5. The assembly of claim 1, further comprising: a plurality of annular rings positioned about a portion of said one end panel and a top edge of said access door such that said access door can be pivoted about the fulcrum axis when said locking means is disengaged.

6. A cage for shielding a user from wildlife threat, said cage comprising:
    a pair of oppositely facing side panels each having a centrally registered longitudinal axis and further having top and bottom edges equidistantly spaced from the respective axes, said top and bottom edges extending along an entire longitudinal length of said cage and being aligned parallel the respective axes;
    coextensively shaped top and bottom panels provided with oppositely disposed sides extending along an entire longitudinal length of said cage, said top and bottom panels being directly engaged with said side panels for defining a cavity therebetween;
    a pair of oppositely facing end panels directly conjoined to said top and bottom panels and said side panels respectively, one said end panels including an access door pivotal about a fulcrum axis defined orthogonal to the longitudinal axes of said side panels;
    means for locking said access door at a lowered position;
    a plurality of spikes extending outwardly from said cage for deterring animals from tampering with said cage, said spikes being suitably sized and shaped for fitting between the mesh pattern in such a manner that said spikes lay coplanar with said side panels, said top and bottom panels and said end panels respectively during lowered positions; and
    means for manually rotating said spikes between extended and retracted positions wherein said extended position is defined orthogonal to an associated one of said side panels, top and bottom panels and end panels and said retracted position is defined parallel to said associated panel;
    wherein each said side panels, top and bottom panels and said end panels are formed from rigid steel shafts arranged in a mesh pattern.

7. The assembly of claim 6, wherein said manual rotating means comprises:
    a plurality of rectilinear housings situated exterior of said cage and spaced adjacent to selected ones of said side panels, top and bottom panels and end panels respectively, each said housings having a hollow tubular shape provided with a threaded interior surface extending along an entire longitudinal length thereof respectively;

a plurality of teethed gears threadably engaged with said interior surface of said tubes respectively;

at least one actuating rod rotatably seated within a selected one of said steel shafts, said actuating rod laterally extending out of said selected steel shafts and terminating within said selected housing wherein said rod is monolithically formed with said teethed gears such that said rod rotates within said selected steel shaft and about an axis defined orthogonal to said selected housing as said teethed gears rotate within said selected housing;

an L-shaped lever monolithically formed with said rod and extending outwardly from said selected steel shaft, said lever being spaced from said selected housing and manually rotatable along an arcuate path defined along at least 90 degrees; and wherein said teethed gears are monolithically formed with said spikes and rotate in sync with said rod such that said spikes are biased between raised and lowered positions when said lever is articulated 90 degrees.

8. The assembly of claim 6, further comprising: a plurality of fastening members including male and female members monolithically formed with said cage and situated adjacent opposed corners of said side panels, said top and bottom panels and said end panels respectively, said male members being slidably positional into said female members by lifting selected ones of said side panels, said top and bottom panels and said end panels along a vertical plane such that the user can quickly and efficiently assemble said cage as needed.

9. The assembly of claim 6, wherein said locking means comprises:

first and second pairs of finger tabs pivotally conjoined directly to opposite sides of said access door, said finger tabs being rotatable along a 360 degree arcuate path and equidistantly offset from the access door sides, each said first and second pairs of finger tabs extending beyond the sides of said access door and terminating laterally inwardly of opposed sides of said one end panel such that said access door cannot be pivoted beyond a lowered position while said first and second pairs of finger tabs are aligned parallel to the fulcrum axis.

10. The assembly of claim 6, further comprising: a plurality of annular rings positioned about a portion of said one end panel and a top edge of said access door such that said access door can be pivoted about the fulcrum axis when said locking means is disengaged.

11. A cage for shielding a user from wildlife threat, said cage comprising:

a pair of oppositely facing side panels each having a centrally registered longitudinal axis and further having top and bottom edges equidistantly spaced from the respective axes, said top and bottom edges extending along an entire longitudinal length of said cage and being aligned parallel the respective axes;

coextensively shaped top and bottom panels provided with oppositely disposed sides extending along an entire longitudinal length of said cage, said top and bottom panels being directly engaged with said side panels for defining a cavity therebetween;

a pair of oppositely facing end panels directly conjoined to said top and bottom panels and said side panels respectively, one said end panels including an access door pivotal about a fulcrum axis defined orthogonal to the longitudinal axes of said side panels;

means for locking said access door at a lowered position;

a plurality of spikes extending outwardly from said cage for deterring animals from tampering with said cage, said spikes being suitably sized and shaped for fitting between the mesh pattern in such a manner that said spikes lay coplanar with said side panels, said top and bottom panels and said end panels respectively during lowered positions, wherein said spikes are evenly spaced along said side panels, said top and bottom panels and said end panels respectively; and means for manually rotating said spikes between extended and retracted positions wherein said extended position is defined orthogonal to an associated one of said side panels, top and bottom panels and end panels and said retracted position is defined parallel to said associated panel;

wherein each said side panels, top and bottom panels and said end panels are formed from rigid steel shafts arranged in a mesh pattern.

12. The assembly of claim 11, wherein said manual rotating means comprises:

a plurality of rectilinear housings situated exterior of said cage and spaced adjacent to selected ones of said side panels, top and bottom panels and end panels respectively, each said housings having a hollow tubular shape provided with a threaded interior surface extending along an entire longitudinal length thereof respectively;

a plurality of teethed gears threadably engaged with said interior surface of said tubes respectively;

at least one actuating rod rotatably seated within a selected one of said steel shafts, said actuating rod laterally extending out of said selected steel shafts and terminating within said selected housing wherein said rod is monolithically formed with said teethed gears such that said rod rotates within said selected steel shaft and about an axis defined orthogonal to said selected housing as said teethed gears rotate within said selected housing;

an L-shaped lever monolithically formed with said rod and extending outwardly from said selected steel shaft, said lever being spaced from said selected housing and manually rotatable along an arcuate path defined along at least 90 degrees; and wherein said teethed gears are monolithically formed with said spikes and rotate in sync with said rod such that said spikes are biased between raised and lowered positions when said lever is articulated 90 degrees.

13. The assembly of claim 11, further comprising: a plurality of fastening members including male and female members monolithically formed with said cage and situated adjacent opposed corners of said side panels, said top and bottom panels and said end panels respectively, said male members being slidably positional into said female members by lifting selected ones of said side panels, said top and bottom panels and said end panels along a vertical plane such that the user can quickly and efficiently assemble said cage as needed.

14. The assembly of claim 11, wherein said locking means comprises:

first and second pairs of finger tabs pivotally conjoined directly to opposite sides of said access door, said finger tabs being rotatable along a 360 degree arcuate path and equidistantly offset from the access door sides, each said first and second pairs of finger tabs extending beyond the sides of said access door and terminating laterally inwardly of opposed sides of said one end panel such that said access door cannot be pivoted beyond a lowered position while said first and second pairs of finger tabs are aligned parallel to the fulcrum axis.

15. The assembly of claim 11, further comprising: a plurality of annular rings positioned about a portion of said one end panel and a top edge of said access door such that said access door can be pivoted about the fulcrum axis when said locking means is disengaged.

* * * * *